United States Patent
Reisman et al.

(10) Patent No.: US 6,992,581 B2
(45) Date of Patent: Jan. 31, 2006

(54) METHOD AND APPARATUS FOR ATTENUATING OF A BROADCASTING RECEIVED SIGNAL FOR ACHIEVING A BETTER DISTANCE RESOLUTION IN MONITORING SYSTEMS

(75) Inventors: Yoav Reisman, Raanana (IL); Guy Greitser, Haifa (IL); Natan Galperin, Zoran (IL); Gil Gemer, Nirit (IL); Lev Rusman, Lod (IL); Dan Zeeli, Rishon La Zion (IL)

(73) Assignee: Dmatek Ltd., Tel Aviv (IL)

( * ) Notice: Subject to any disclaimer, the term of this patent is extended or adjusted under 35 U.S.C. 154(b) by 0 days.

(21) Appl. No.: 10/619,544

(22) Filed: Jul. 16, 2003

(65) Prior Publication Data

US 2005/0012656 A1 Jan. 20, 2005

(51) Int. Cl.
*G08B 1/08* (2006.01)
(52) U.S. Cl. .......................... 340/539.12; 340/539.21; 340/573.1
(58) Field of Classification Search ........... 340/539.12, 340/539.21, 573.1, 539.11, 539.13, 539.16, 340/539.17, 539.22, 539.23, 825.36, 825.49
See application file for complete search history.

(56) References Cited

U.S. PATENT DOCUMENTS

| | | | |
|---|---|---|---|
| 5,504,474 A | 4/1996 | Libman et al. | |
| 5,589,821 A * | 12/1996 | Sallen et al. | 340/573.4 |
| 5,831,535 A | 11/1998 | Reisman et al. | |
| 5,936,529 A | 8/1999 | Reisman et al. | |
| 6,127,931 A * | 10/2000 | Mohr | 340/573.4 |
| 6,255,951 B1 * | 7/2001 | De La Huerga | 340/573.1 |
| 6,392,547 B1 * | 5/2002 | Stewart et al. | 340/573.1 |
| 6,756,901 B2 * | 6/2004 | Campman | 340/573.1 |

* cited by examiner

Primary Examiner—Toan N. Pham
(74) Attorney, Agent, or Firm—Foley & Lardner LLP (57) ABSTRACT

A receiving unit and method for determining the distance of an object from a receiving unit in a monitoring system, the receiving unit receives transmitted signals, the receiving unit comprises an attenuating unit for attenuating the transmitted signals by a controlled factor; a receiver for receiving and processing the transmitted signals into readable data; a microcontroller for controlling the operation of the local monitoring unit; and an electronic circuitry for calculating the received strength signal indication, whereby the distance of an object from the receiving unit can be determined.

15 Claims, 5 Drawing Sheets

| Distance[m] | RSSI Level | RF Voltage [μvoltes] |
|---|---|---|
| 1 | 202 | 4350 |
| 2 | 202 | 2175 |
| 3 | 202 | 1450 |
| 4 | 202 | 1090 |
| 5 | 202 | 870 |
| 6 | 202 | 725 |
| 7 | 202 | 621 |
| 8 | 200 | 544 |
| 9 | 197 | 483 |
| 10 | 195 | 435 |
| 30 | 174 | 145 |
| 100 | 151 | 44 |
| 200 | 137 | 15 |

FIG. 4A

| Distance[m] | RSSI Level | RF Voltage [μvoltes] |
|---|---|---|
| 1 | 239 | 4350 |
| 2 | 228 | 2175 |
| 3 | 220 | 1450 |
| 4 | 215 | 1090 |
| 5 | 212 | 870 |
| 6 | 208 | 725 |
| 7 | 205 | 621 |
| 8 | 201 | 544 |
| 9 | 197 | 483 |
| 10 | 195 | 435 |
| 30 | 174 | 145 |
| 100 | 151 | 44 |
| 200 | 137 | 15 |

METHOD AND APPARATUS FOR ATTENUATING OF A BROADCASTING RECEIVED SIGNAL FOR ACHIEVING A BETTER DISTANCE RESOLUTION IN MONITORING SYSTEMS

BACKGROUND OF THE INVENTION

1. Field of the Invention

The present invention generally relates to electronic monitoring systems. More specifically the present invention relates to an improved local monitoring unit for enhancing the tracking and locating capability of a monitoring system. The present invention further relates to a local monitoring unit which comprises an attenuation mechanism in order to achieve a better distance estimation resolution.

2. Discussion of the Related Art

Electronic monitoring systems for remote monitoring and supervising of moving objects, and in particular for monitoring persons, are known in the art. The advantages of employing such a system in a wide range of applications in a variety of fields, including security, law enforcement, medical and more are known. Decreasing restrictions of the monitored person, decreasing in man-power, discreetness, low cost comparing other monitoring systems, easy installation and mobility, multipurpose operation, are only few examples. A typical monitoring system comprises a plurality of portable transmitting devices, known as "tags" (one or more fixed or mobile), local monitoring unit and a central monitoring station. A tag is a device worn by a monitored person, the tag is capable of sending signals form a local monitoring unit. A local monitoring unit is a device designed to receive and send signals to and from a tag or a number of tags and to and from one or more central monitoring stations. The central monitoring station is ordinarily a computer device for collecting and further processing all the information received by the local monitoring unit. Each tag has an identification code. The identification code may be a unique code specific to the subject with whom the tag is associated, such that the subject can be distinguishably identified. Alternatively, the identification code may be a code typical to a certain group. For example, in a hospital, staff may wear a tag having one identification code while patients wear tags having a second identification code. The local monitoring unit includes a radio frequency (RF) or other signal receiving unit tuned to the frequency of the signals transmitted by the transmitting tags. Typically, the local monitoring unit further includes a microprocessor to allow local processing of the data before sending it to the central monitoring station. The communication between local monitoring units and a central monitoring station may be either wireless communication, such as RF, or by conventional communication lines such as telephone lines, cable TV, WAN, LAN and a like.

When used for monitoring persons, the portable tag is usually strapped around a limb of the person being monitored and typically includes various sensors for sensing tampering with the tag and other activities of the monitored person. The sensors periodically transmit corresponding signals, including the tag identification code and the sensor's data. The signals are broadcasted periodically, to be received by one or more local monitoring units, whereby they are processed and optionally reported to the central monitoring station. Current tags typically include microprocessors which enable programming the operation of the tag with regard to various parameters in order to meet the requirements specific to the subject to whom the tag is attached. Thus, parameters such as sampling intervals, data transmission intervals, monitored time periods, permitted and barred locations and a like, can be selected according to the specific needs.

U.S. Pat. Nos. 5,504,474, 5,831,535 and 5,936,529, all assigned to the present assignee and incorporated herein by reference, including drawings and references cited therein, disclose a tamper-resistant tag of the type described above, for use with monitoring systems. U.S. Pat. No. 5,936,529 further teaches a manual resetting device which, when connected to the tag, enables external reprogramming of the tag by authorized parties. Thus, program parameters can be easily reset for reuse with another subject.

Generally, monitoring systems are operated under two basic configurations. One configuration comprises separate independent local monitoring systems, each comprising one or more local monitoring units dedicated to one or more tags which are confined to a pre-determined location. The confined area can vary in size and accordingly the strength of the signal emitted from the tag, or the reception level of the local monitoring unit is set to fit the specific area. The local monitoring units may report to a central monitoring station where information from separate units is collected and compared to the specific program requirements put on the specific monitored person. Alternatively, a local monitoring unit, can serve a separate monitoring station and may process the data independently for further action. Monitoring systems of this type are used for example for criminal offenders under house arrest, where the offender is required to stay in a pre-designated location or for Alzheimer patients where there is a danger of the patient getting lost, and a like. In wake of recent events the system is also used for monitoring patients carrying infectious diseases. Typically, the pre-designated location is the monitored person residence, place of work, confinement area and the like.

Another configuration is an area monitoring system (AMS) where a network of monitoring units "covers" a restricted area in which a plurality of tag carriers are moving. Such systems are employed in building facilities and surrounding, for example hospitals, rehabilitation centers and a like, where a large number of persons are monitored within the same area. The arrangement of the local monitoring units in a monitored area is such that the receiving range of each monitoring unit covers a certain part of the whole area. Preferably the zones covered by adjacent monitoring units overlap such that the signals transmitted by tags are received by more than one monitoring unit. The data collected from all monitoring units is reported to a central monitoring station where, by applying various methods, the location of each of the tag carriers is determined to more or less degree of accuracy.

Where tag carriers are required to stay in pre-designated locations, it is important to determine the location of each tag carrier accurately. Accurate determination of the tag carriers' location is necessary in order to identify whether a tag carrier has out stepped a pre-designated boundary such as a room or other confined space or is approaching a port hole or certain restricted areas. For example: criminal offenders, patients such as mental illness patients or Alzheimer patients or infectious diseases patients, young children and a like may be restricted to a particular room or an area. If such persons exit a room or try to cross a port hole or approach a door the system should be able to alert the restricted actions performed by such monitored persons. In addition, determining an accurate location of a monitored subject is important in cases in which patients need close care and urgent medical treatment upon request.

High accuracy distance estimation methods may employ triangulation calculations based on received signal analysis, time-of-arrival analysis, angle-of-arrival analysis, received signal strength indication (RSSI) or combinations thereof. Simpler "cell based" methods may use a set of rules based on knowledge of the coverage area of each of the monitoring units and of overlapping regions. The simpler "cell based" methods are inherently limited by the number of the local monitoring units distributed within the monitored area and their coverage area. While other known methods suffer from a number of drawbacks. Triangulation methods and angle-of-arrival method may involve special relatively expensive technology such as direction-finding receivers and may suffer from inaccuracy due to screening and reflecting effects, especially when used indoors. The tracking and locating ability of monitoring system, i.e., the ability to continuously locate the position of individuals as they move throughout a restricted zone, depends on the space and time resolution of the information received. Obviously, the higher the number of monitoring units distributed within a confined area and the shorter the time intervals between successive signals, the better is the tracking resolution. However, expense consideration put constraints on the number of monitoring units and power consumption consideration limit the signal transmission repetition rate. The RSSI method uses the fact that the RSSI decreases while the distance between a monitored person and a local monitoring unit increases. An estimation of the distance between a monitored person and a monitoring local unit can be made by using pre measurements of the dependency between the RSSI signal and the distance or by making calculations for finding such dependency. For long distances, the RSSI is weak, relative to the receiver dynamic range and good accuracy distance estimation can be made. However, as a monitored person moves toward a local monitoring unit, the RSSI increases. Decreasing the distance may, further more cause the receiver, which is a part of the local monitoring unit, to saturate. When saturated, the RSSI increases only slightly or may not increase at all, while the distance between the monitored person and the monitoring unit continues to decrease. In fact, two different distances may get the same RSSI values and hence the same distance estimation. To conclude, a saturation effect may cause non accurate distance estimation between a monitored person and a monitoring unit. A combination of an RF and other monitoring system such as an infra red (IR) detector may be used to overcome that problem and to determine the location of the monitored person at short distances. However, IR systems involve special relatively expensive technology and may suffer from inaccuracy due to screening blinding and reflecting effects, both indoors and outdoors. IR systems also require a line of sight which is a significant drawback especially indoors or when the tag is carried in a such a way that its position relative to the fixed reader can not be pre-set (i.e on a person but not necessarily visibly presented at all times). There is therefore a need for a method and apparatus for enhancing the distance estimation accuracy between a monitored person wearing a transmitting tag and a local monitoring unit.

The present invention, by adding a novel feature within the existing basic structure of a local monitoring unit, provides enhancement of tracking and locating capability of a monitoring system. Furthermore, the novel feature of the present invention provides benefits such as, for example, control over accessibility to particular zones or equipment within a restricted area and control over the movements and actions of monitored subjects.

SUMMARY OF THE PRESENT INVENTION

It is the general object of the present invention to provide an attenuation mechanism that keeps the RF receiver of a monitoring unit out of saturation for enhancing the tracking and locating capability of a monitoring system thus allowing high accuracy distance estimation calculation between a monitored person wearing a transmitting tag and a local monitoring unit.

Another object of the present invention is to provide an accurate distance estimation between a monitored person wearing a transmitting tag and a local monitoring unit, which can also be used in conjugation with an operating system coupled to a local monitoring unit, and in particular, for allowing or denying access to particular zones by controlling door lock mechanism.

Yet, a further object of the present invention is to provide electronic monitoring system with enhanced tracking resolution and enhanced control over subject accessibility to particular zones within a confined area.

The above and other objectives are met by providing an attenuation mechanism that maintains the RF receiver of the monitoring unit out of saturation.

Additional objectives, features and advantages of the invention will become apparent from the following detailed description.

According to one aspect of the present invention there is provided a receiving unit associated with at least one local monitoring unit for use in a monitoring system, the receiving unit receives signals transmitted from at least one transmitting tag, the receiving unit comprising: an attenuating unit for attenuating the transmitted signals by a controlled factor; a receiver for receiving and processing the transmitted signals into readable data; a microcontroller for determining the distance between the at least one transmitting tag and the receiving unit and an electronic circuitry for calculating the received strength signal indication. The receiving unit can further comprise an antenna for receiving the transmitted signal by the at least one transmitting tag and an analog to digital converter for converting the transmitted signals into digital signals. The transmitted signals can be radio frequency signals or the like.

In accordance with yet another aspect of the present invention there is provided a method for determining the distance of an at least one transmitting tag from a receiving unit, the method comprising the steps of: waiting for a signal to be received from an at least one transmitting tag; receiving the received signal, the received signal passes to a microcontroller for processing; measuring the received signal and calculating the received strength signal indication of the received signal; If the received strength signal indication is equal to a threshold level the microcontroller is updated and the attenuation is increased. If the received signal strength indication is smaller than the threshold level, the microcontroller is queried to obtain a current attenuation factor value and a distance between the receiver and the at least one transmitting tag is calculated. The threshold level can be pre-calculated based on the receiver parameters. The calculation can be performed using a lookup table. The transmitting tag can be worn by a monitored person or animal or fixed and moving objects.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention relates to a monitoring unit with an attenuation mechanism for enhancing the tracking resolution. In other words, the present invention improves the distance estimation between a monitoring unit or a receiving station and a monitored person.

The attenuation mechanism can be implanted in a local monitoring unit, in such an embodiment that attenuation will be incorporated in the signal processing only if required. Typically, a local monitoring unit, in which the novel features of the present invention can be implemented, comprises an antenna, an RF receiver, a micro controller, an analog to digital (A/D) component. The RSSI parameter can be used to determine the distance between a monitored person wearing a tag and a local monitoring unit. An estimation of the distance between a monitored person and a monitoring unit can be made by using pre measurements of the dependency between the RSSI and the distance or by calculating such dependency. For long distances, the RSSI is weak relative to the receiver dynamic range and good accuracy distance estimation can be made. However, as a monitored person moves towards a local monitoring unit, decreasing the distance to the monitoring unit, the RSSI increases. Decreasing the distance may further more cause the RF receiver, which is a part of the local monitoring unit to saturate. When saturated, the RSSI increases only slightly or may not increase at all, while the distance between the monitored person and the monitoring unit decreases significantly. In fact, two different distances may get the same RSSI values and hence the same distance estimation.

The present invention solves saturation effects that may be caused by the RF receiver of the local monitoring unit, by adding an attenuator before the RF receiver and attenuating the RF signal. The attenuator is being controlled by a microcontroller such that the RF receiver of the monitoring unit will not saturate. As a result, the RSSI will always remains proportional to the distance between the monitoring unit and the monitored person allowing accurate distance estimation.

Few examples for attenuation mechanism comprise: air transformer, polarization planes control, electronic devices such as resistors, transistors and a like. It will be easily appreciated by persons skilled in the art that other ways for attenuation may be used as well.

Figure 1:
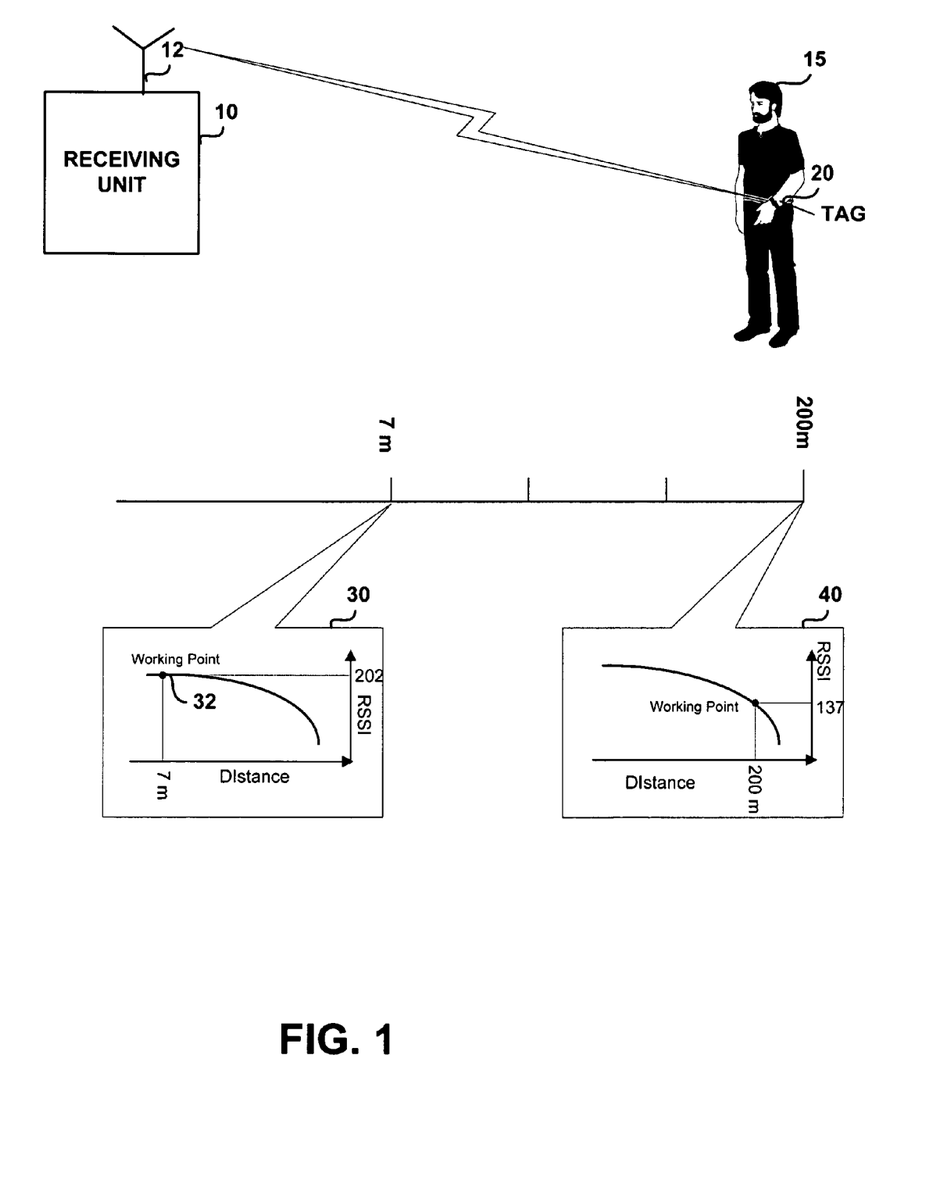
FIG. 1 is a pictorial representation of the operative concept of the present invention and a schematic RSSI graphs at different distances showing and demonstrating RSSI saturation in prior art of monitoring units.

FIG. 1 is a pictorial representation of the operative concept of the present invention and a schematic RSSI graphs at different distances showing and demonstrating RSSI saturation known in monitoring units. The pictorial representation demonstrates the difficulties in achieving high resolution distance estimation between a monitoring unit 10 and a monitored person 15 wearing a transmitting tag 20. A monitoring unit 10 includes an antenna 12, a receiver and other optional electrical components (not shown). A typical transmitting tag, such as tag 20, comprises an RF transmitter for transmitting signals to the monitoring unit 10. Tag 20 can be implemented, as disclosed in U.S. Pat. Nos. 5,504,474, 5,831,535 and 5,936,529 incorporated herein by reference. The distance between the monitoring unit 10 and the monitored person 15 wearing the transmitting tag 20 is known, by other means than by a determination of the RSSI, with an error of less than 1 meter. FIG. 1 represents two cases, for each, the RSSI (30 and 40) is being calculated. The first case represents a monitored person 15 wearing a transmitting tag 20 distant 200 meter from monitoring unit 10. At 200 meter distant, the RSSI is 137. According to the RSSI calculations 40 (see FIG. 4A for a table of correlation distance between a monitored person 15 and a monitoring unit 10, based on the RSSI levels of a receiver) RSSI of 137 translate to a distance of 200 meter. The second case represents a monitored person 15 wearing a transmitting tag 20 distant 7 meter from a monitoring unit 10. At 7 meter distant, RSSI is 202. According to the RSSI calculations 30, RSSI of 202 translates to 7 meter distant. When the monitored person 15 is moving closer to the monitoring unit 10, the distance decreases and the RSSI increases. It can be seen in the graph of the RSSI versus the distance 30, that the RSSI is not increasing while the distance decreases to less than 7 meter. Furthermore, according to FIG. 4A, the RSSI is 202 for any distance smaller than 7 meter (see rows 420 to 430 in FIG. 4A). The working point 32 shown in graph 30 defines the saturation level of the RSSI. Beyond the working point 32 distances smaller than 7 meter between a monitored person 15 wearing a transmitting tag 20 are indistinguishable.

Figure 2:
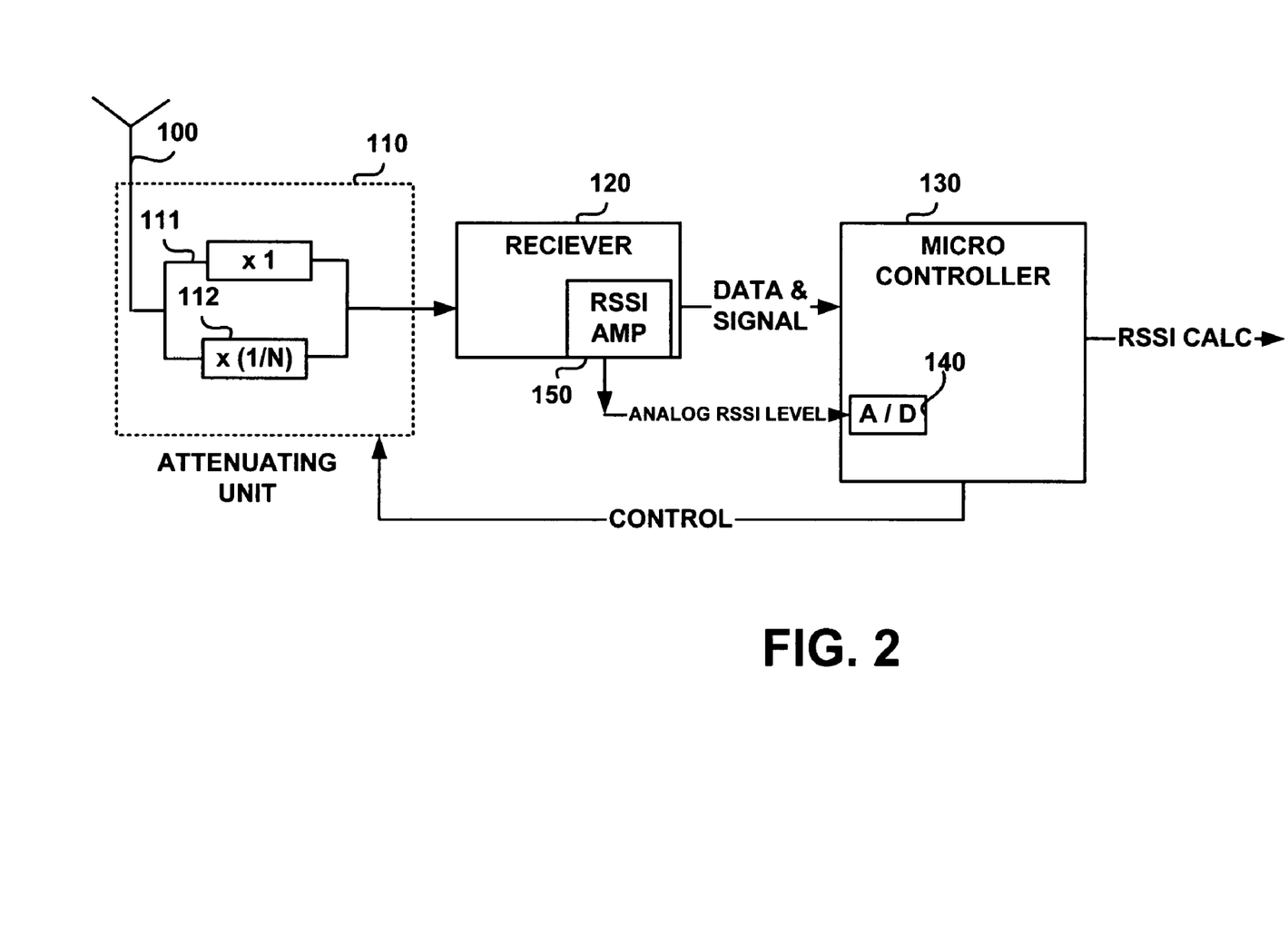
FIG. 2 illustrates a block diagram of the main components of the electronic circuitry of a local monitoring unit, in accordance with a preferred embodiment of the present invention.

FIG. 2 illustrates a block diagram of the main components of the electronic circuitry of a monitoring unit in accordance with a preferred embodiment of the present invention. The electronic circuitry includes an antenna 100 for receiving the transmitted signal by a transmitting tag, an attenuating unit 110 for attenuating the RF input voltage of the antenna, an electronic RF receiver 120 for receiving and processing the RF signals into readable data, an analog to digital converter (A/D) 140 for converting the analog RF input signal into digital signals, a microcontroller 130 for controlling the operation of the monitoring unit and an electronic circuitry 150 for amplifying the RSSI. Antenna 100 receives the input RF signal from the transmitting tag 20 of the monitored person 15 in FIG. 1, and passes the signal to a receiver 120 through an attenuating unit 110. Attenuating unit 110 operates in two operational modes. According to the first mode, there is no attenuation and the signal passes to a receiver 120 through a first attenuating path 111. According to the second mode, the signal is attenuated by a factor of N and passes to receiver 120 through a second attenuating path 112. Attenuation is determined by a micro controller 130 according to the method of the present invention so that receiver 120 is not saturated. Receiver 120 receives the attenuated or non attenuated signals from the attenuating unit 110, recovers and processes the RF signals into readable data. The signal and the data that were transmitted by tag 15 worn by the monitored person 20 in FIG. 1, are passed to a micro controller 130 for determining whether to use the data or signals. RSSI amplifier 150 calculates the RSSI signal derived from the signal strength received by the receiver 120 and passes the analog RSSI level to the analog to digital converter unit 140 within the micro controller 130 for further processing. The RSSI will be used in the context of the present invention to further calculate (through the use of a lookup table or other calculation) the distance between a monitored person 15, wearing a transmitting tag 20 of FIG. 1.

The micro controller 130 having converted the analog RSSI level to digital form can further determine how to control the attenuating unit and whether to attenuate the next received signal by a factor of N. Micro controller 130 receives the signal and the data from receiver 120 for further processing. As explained previously, two operational modes are possible. In accordance with the first operational mode, the signal is not saturated and accurate distance estimation can be made using the RSSI. In accordance with the second operational mode, the signal is saturated and accurate distance estimation can not be made using the RSSI without having to attenuate the signal. Data containing various parameters in order to meet the requirements specific to the subject to whom the transmitting tag is attached, can be obtained and further processed by micro controller 130. The data may be a trigger for preprogrammed operations modes or may be transferred to a monitoring station in accordance with predetermined rules or local processing. Due to saturation, distance estimation can not be made using the RSSI and therefore micro controller 130 controlling the attenuating unit will now determine the attenuation for next received signal.

Analog to digital converter 140 also converts the analog RF input signals into digital signals for allowing the micro controller to handle the signals and the data in digital form.

Figure 3A:
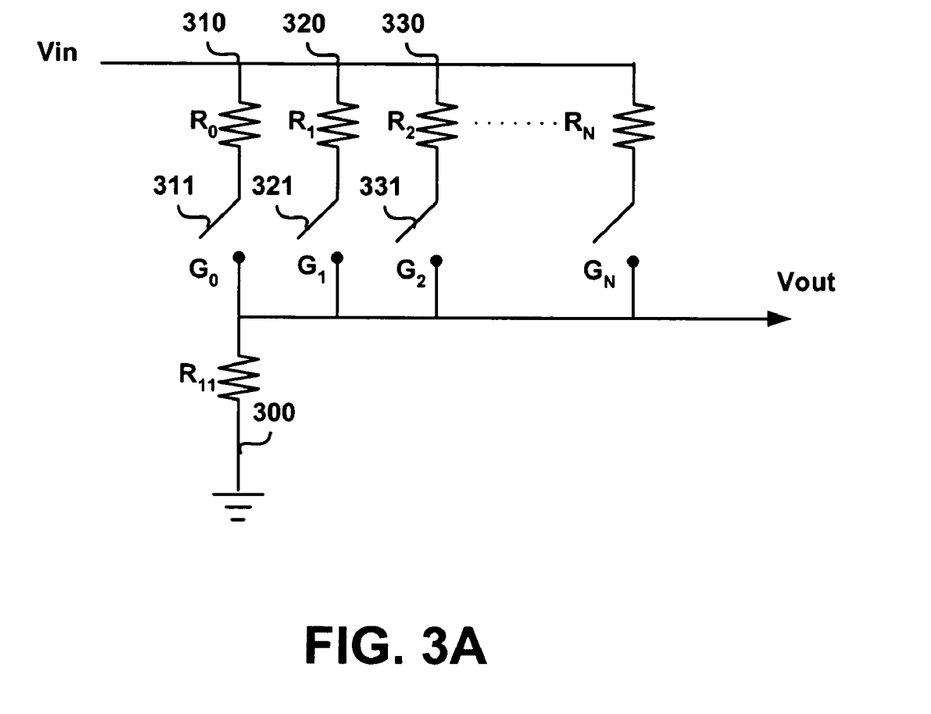
FIGS. 3A, 3B illustrate examples of two alternative circuitry embodiments for achieving the desired attenuation, in accordance with the present invention.
Figure 3B:
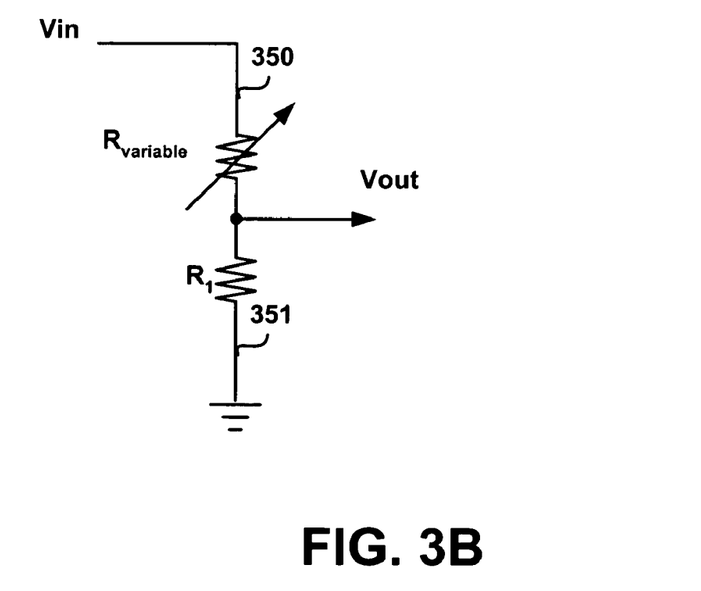

FIGS. 3A, 3B illustrate examples of two alternative circuitry embodiments for achieving the desired attenuation in accordance with the present invention. FIG. 3A illustrates a controlled voltage divider. According to that embodiment, a fixed resistor $R_{11}$ 300 is connected in series to resistors $R_0$ to $R_n$, 310, 320, 330 etc. . . . , while $R_0$ to $R_n$ are connected in parallel to each other. A resistor $R_{11}$ 300 is connected to any of the other resistors by closing a separate gate $G_0$ to $G_N$, 311, 321,331 etc. for each resistor. If no attenuation (X1 attenuation) is needed, resistor $R_0$ 310, having resistant much smaller than $R_{11}$ 300 (i.e. $R_0 << R_{11}$), is connected solely to $R_{11}$ 300, using gate $G_0$ 311, results in $V_{in} \approx V_{out}$. It will be easily appreciated by person skilled in the art that alterative attenuations, still achieves the desired attenuation in accordance with the present invention and will not require the condition of $R_0 << R_{11}$ to be satisfied. When attenuation is required, one or more of resistors $R_0$ to $R_n$, 310, 320, 330 etc, are connected to resistor $R_{11}$ 300, using gates $G_0$ to $G_N$, 311, 321,331 and the like, results in attenuation of $V_{out}$. For example, if only one resistor is connected simultaneously to resistor $R_{11}$ 300, the result attenuation equals to $R_i/R_{11}+1$. More attenuation values can be obtained by closing few gates and connecting few resistors simultaneously.

FIG. 3B, illustrates an alternative embodiment for achieving the desired attenuation in accordance with the present invention, using a controlled variable resistor 350. A variable resistor 350 is connected to a fixed resistor $R_1$ 351 in series. The controlled variable resistor preferable range is from zero to the needed attenuation in accordance with the requirements of the present invention. If no attenuation (X1 attenuation) is needed, the controlled variable resistor 350 is tuned to zero. Person skilled in the art will appreciate that the controlled variable resistor 350 may have resistant much smaller than $R_1$ 351 (i.e. $\min(R_{variable}) << R_1$) and not zero and still achieves the desired attenuation in accordance with the present invention. When attenuation is required, the controlled variable resistor 350 is tuned to the desirable resistance results in attenuation of $R_{variable}/R_1+1$.

Person skilled in the art will appreciate that the resistors and attenuations, in the present invention, are not limited to the values above. Any value of attenuation obtained by resistors, air transformer, polarization planes control, electronic devises such as resistors, transistors and a like, can be included in the embodiment of the present invention. It will be also appreciated by person skilled in the art that other attenuation operative in attenuating the signal received in $V_{in}$ and send to $V_{out}$ can be use as alternative embodiment to the present invention.

Figure 4A:
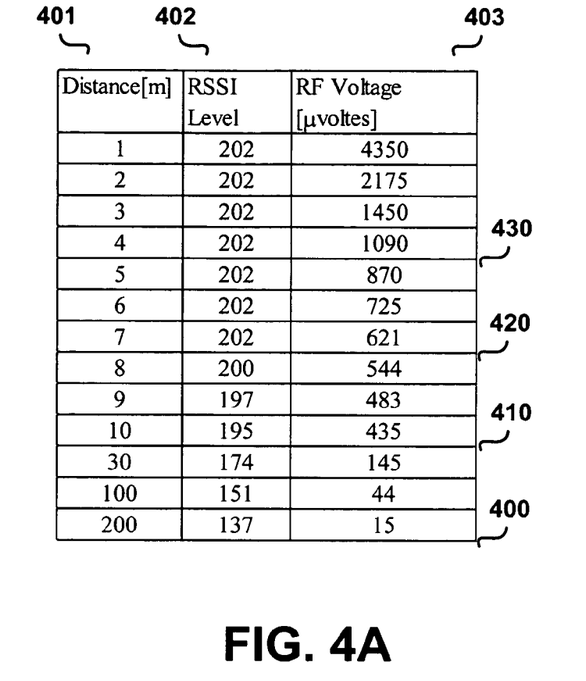
FIGS. 4A, 4B illustrate tables of a correlation distance between a transmitter (monitored person) and a receiver (local monitoring unit), based on RSSI levels.
Figure 4B:
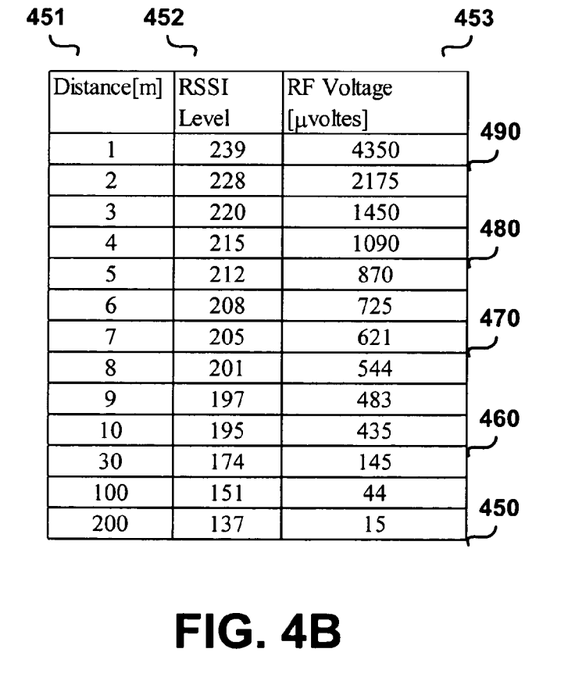

FIGS. 4A, 4B illustrate tables of a correlation distance between a transmitter (transmitting tag worn by a monitored person) and a receiver (local monitoring unit), based on RSSI levels calculated after the RF receiver at the local monitoring unit. FIG. 4A is an example for a correlation distance between a transmitter and a receiver without double scale (i.e. without attenuation while the receiver is saturated). The table demonstrates the difficulties in achieving high resolution distance estimation between a monitoring unit 10 and a monitored person 15 wearing a transmitting tag 20 in FIG. 1. Line 400 represents the calculated RSSI for a distance of 200 meter between the transmitting tag and the monitoring unit. The RSSI is 137, which translates to a distance of 200 meter. Line 410 represents the calculated RSSI for a distance of 10 meter between the transmitting tag and the monitoring unit. The RSSI is 195 [UNITS], which translates to a distance of 10 meter. Person skilled in the art will easily appreciate that the RSSI is proportional to the distance for distances as short as up to 7 meter. Decreasing the distance to 4 meter, line 430 results in the same RSSI as at 7 meter distant. Consequently, accurate estimation of the distance is impossible for distances shorter than 7 meter due to saturation effect.

FIG. 4B is an example for a correlation distance between a transmitter and a receiver using a double scale (i.e. attenuation is incorporated while the receiver is saturated). Person skilled in the art will easily appreciate that the RSSI is proportional to the distance for distances as short as up to 1 meter and no saturation effects occur. Distances that were undistinguishable by the RSSI, in FIG. 4A (line 430) are now easily distinguishable (line 480) and a correlation between the distance to the transmitting tag and the RSSI is unique.

Figure 5:
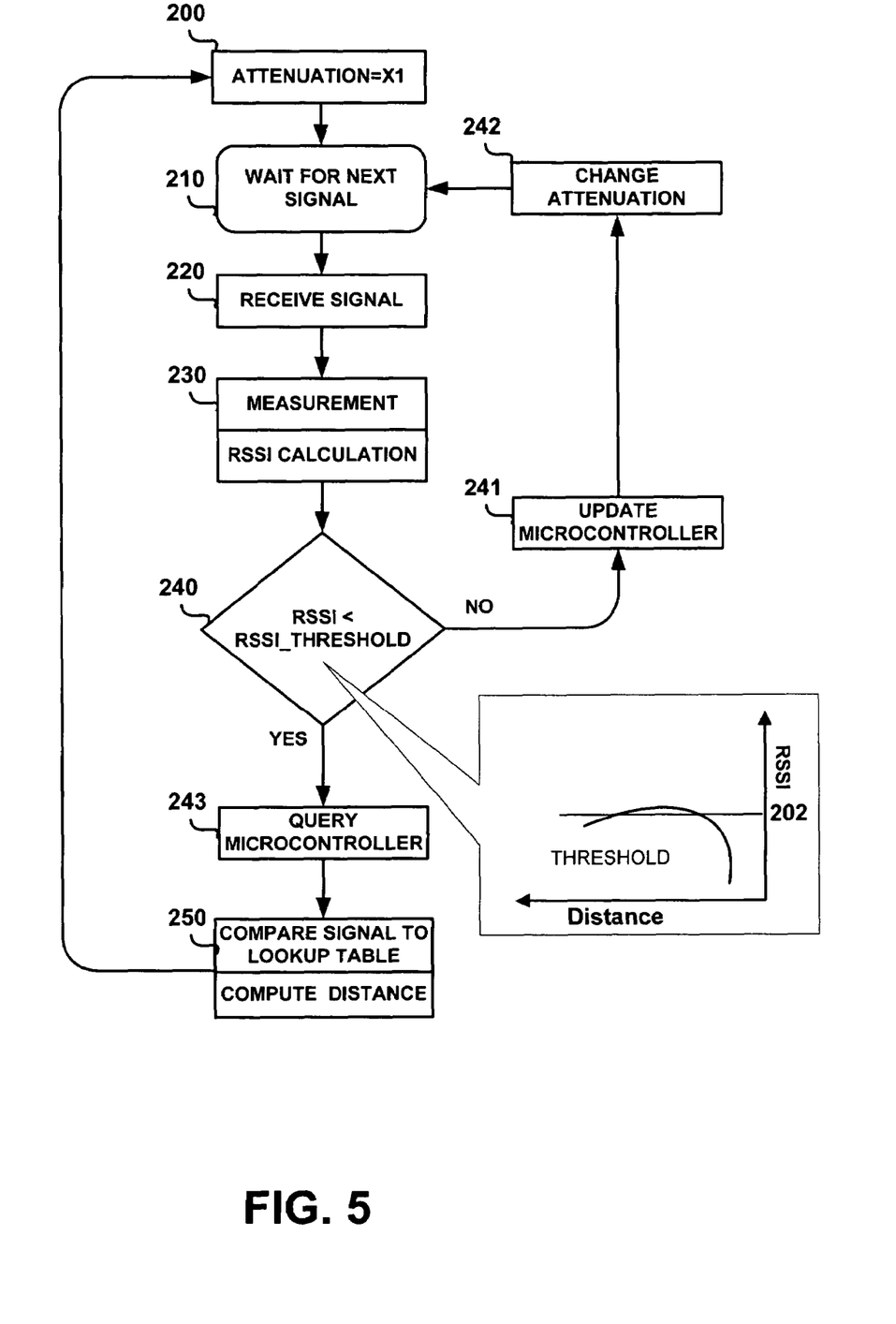
FIG. 5 is a flow chart depicting the main steps of controlling a local monitoring unit, in accordance with the present invention.

FIG. 5 is a flow chart depicting the main operational steps of controlling a local monitoring unit in accordance with the present invention.

The default attenuation of the system is X1 (step 200). The system is waiting for a signal from the transmitting tag 20 of the monitored person 15 in FIG. 1 (step 210). Upon receiving a signal by the RF receiver (step 220), the signal and data passes to the micro controller for processing. The data may be stored, transferred to the monitoring station or use as a trigger for another operation. The signal received is measured by the receiver and the RSSI is calculated out of the measured receiver signal (step 230). If the RSSI is not smaller than a threshold level that was pre calculated based on the RF receiver parameters (step 240) (for example, in the illustrating tables in FIG. 4A line 420 the threshold is 202), the micro controller is updated 241 with the factor value of the attenuation required and subsequently in step 242 the attenuation is increased and the system waits for the next signal (step 210). If the RSSI is smaller than the threshold level that was predetermined (step 240), the micro controller is queried to obtain the current attenuation factor value (step 243) and the distance between the receiver and the transmitter is calculated using a lookup table or by other means (step 250). Person skilled in the art will appreciate that the mechanism for determining the threshold may be predetermined (off line) or adaptive (on line) or combination thereof. It will be also appreciated by persons skilled in the art that the present invention is not limited to what has been particularly shown and described hereinabove. Rather the scope of the present invention is defined only by the claims which follow.

We claim:

1. A receiving unit associated with at least one local monitoring unit for use in a monitoring system, the receiving unit receiving transmitted signals transmitted from at least one transmitting tag, the receiving unit comprising:
    a receiver for receiving and processing the transmitted signals into readable data;
    electronic circuitry for calculating the received strength signal indication;
    an attenuating unit for attenuating the received signals by a controlled factor, said controlled factor being determined in accordance with said received signal strength indication; and
    a microcontroller for determining the distance between the at least one transmitting tag and the receiving unit.

2. The receiving unit of claim 1 further comprising an antenna for receiving the transmitted signal by the at least one transmitting tag.

3. The receiving unit of claim 1 further comprising an analog to digital converter for converting the transmitted signals into digital signals.

4. The receiving unit of claim 1 wherein the transmitted signals are radio frequency signals.

5. The system of claim 1 wherein the receiving unit is coupled to an operating system for controlling the operating system in according with the distance between the at least one transmitting tag and the receiving unit.

6. The system of claim 5 wherein said operating system is a door lock mechanism.

7. A method for determining a distance of at least one transmitting tag from a receiving unit, the method comprising the steps of:
    waiting for a signal to be received from an at least one transmitting tag;
    passing the received signal to a microcontroller for processing;
    measuring the received signal and calculating a received signal strength indication of the received signal;
    if the received signal strength indication is stronger than a threshold level, updating the microcontroller to increase attenuation of a subsequently received signal.

8. The method of claim 7 further comprising the steps of:
    if the received signal strength indication is smaller than the threshold level, querying the microcontroller to obtain a current attenuation factor value; and
    calculating a distance between the receiver and the at least one transmitting tags.

9. The method of claim 8 wherein the calculation of the distance between the receiver and the at least one transmitting tag is performed using a lookup table.

10. The method of claim 7 wherein the receiver is a radio frequency receiver.

11. The method of claim 7 wherein the threshold level is pre calculated based on the receiver parameters.

12. The method of claim 7 wherein the at least one transmitting tag is worn by a monitored person.

13. The method of claim 7 wherein the at least one transmitting tag is worn by a monitored animal.

14. The method of claim 7 wherein the at least one transmitting tag is a security device attached by a fixed or mobile object.

15. The method of claim 7 further comprising controlling an operating system coupled to the receiving unit in according with the distance between the at least one transmitting tag for allowing or denying accesses to a particular zone or a particular piece of equipment.

\* \* \* \* \*